US008330613B2

(12) United States Patent
Gothard

(10) Patent No.: US 8,330,613 B2
(45) Date of Patent: Dec. 11, 2012

(54) REMOTE CONTROL ELECTRONIC DISPLAY SYSTEM

(75) Inventor: Dave Gothard, Las Vegas, NV (US)

(73) Assignee: Locke International Teast, Naples, FL (US)

( * ) Notice: Subject to any disclaimer, the term of this patent is extended or adjusted under 35 U.S.C. 154(b) by 999 days.

(21) Appl. No.: 12/116,053

(22) Filed: May 6, 2008

(65) Prior Publication Data

US 2010/0309208 A1 Dec. 9, 2010

Related U.S. Application Data

(63) Continuation of application No. 10/874,102, filed on Jun. 21, 2004, now Pat. No. 7,369,058, which is a continuation of application No. 10/010,556, filed on Nov. 8, 2001, now abandoned, which is a continuation of application No. 09/295,894, filed on Apr. 21, 1999, now Pat. No. 6,384,736, which is a continuation-in-part of application No. 09/132,456, filed on Aug. 11, 1998, now abandoned.

(60) Provisional application No. 60/083,597, filed on Apr. 30, 1998.

(51) Int. Cl.

| | |
|---|---|
| ***G08B 23/00*** | (2006.01) |
| ***G08B 5/00*** | (2006.01) |
| ***G08B 5/36*** | (2006.01) |
| ***G09G 5/00*** | (2006.01) |
| ***G06F 15/00*** | (2006.01) |

(52) U.S. Cl. ........... 340/815.4; 340/815.47; 340/815.49; 340/815.6; 340/693.5; 340/693.9; 345/2.1; 345/501

(58) Field of Classification Search ........................ None
See application file for complete search history.

(56) References Cited

U.S. PATENT DOCUMENTS

| | | | |
|---|---|---|---|
| 3,614,727 | A | 10/1971 | Fritts |
| 4,179,723 | A | 12/1979 | Spencer |
| 4,359,631 | A | 11/1982 | Lockwood et al. |
| RE32,115 | E | 4/1986 | Lockwood et al. |

(Continued)

FOREIGN PATENT DOCUMENTS

| | | |
|---|---|---|
| DE | 19504923 | 8/1996 |

(Continued)

OTHER PUBLICATIONS

Connecting Minds. Advancing Light.

(Continued)

*Primary Examiner* — Julie Lieu
(74) *Attorney, Agent, or Firm* — Edward K. Welch, II; IP&L Solutions

(57) ABSTRACT

A remotely controlled electronic display sign which operates with a plasma display and which provides for humidity and heat control and the like allowing the sign to be used in various environments. The sign is essentially self-contained and includes those components necessary for enabling a display of desired material from a remote control source or one located at the sign. A controller in or associated with the sign is accessible either electrically, or through satellite transmission or other wireless transmission from the remote source which allows the display of the sign to be changed at will. Thus, an operator at a remote source may, with the aid of a pre-prepared graphic design, transmit that design to the controller at or associated with the sign for display of that graphic information and potentially with sound.

13 Claims, 7 Drawing Sheets

U.S. PATENT DOCUMENTS

| | | | | |
|---|---|---|---|---|
| 4,594,588 | A * | 6/1986 | Barclay et al. | 345/68 |
| D287,013 | S | 12/1986 | Satherley | |
| 4,817,043 | A | 3/1989 | Brown | |
| 4,888,709 | A | 12/1989 | Revesz et al. | |
| D310,067 | S | 8/1990 | Koprowski et al. | |
| 4,973,952 | A | 11/1990 | Malec et al. | |
| 4,992,774 | A | 2/1991 | McCullough | |
| 5,047,614 | A | 9/1991 | Bianco | |
| 5,061,921 | A | 10/1991 | Lesko et al. | |
| 5,089,745 | A | 2/1992 | Iannini | |
| 5,133,081 | A | 7/1992 | Mayo | |
| 5,179,651 | A | 1/1993 | Taaffe et al. | |
| 5,198,644 | A | 3/1993 | Pfeiffer et al. | |
| 5,198,723 | A | 3/1993 | Parker | |
| 5,218,629 | A | 6/1993 | Dumond, Jr. et al. | |
| 5,255,361 | A | 10/1993 | Callaway et al. | |
| 5,281,018 | A | 1/1994 | Cullinan | |
| 5,285,278 | A | 2/1994 | Holman | |
| 5,287,266 | A | 2/1994 | Malec et al. | |
| 5,289,277 | A | 2/1994 | Blanchard et al. | |
| 5,295,064 | A | 3/1994 | Malec et al. | |
| 5,305,195 | A | 4/1994 | Murphy | |
| 5,309,174 | A | 5/1994 | Minkus | |
| 5,321,520 | A | 6/1994 | Inga et al. | |
| 5,321,725 | A | 6/1994 | Paik | |
| 5,365,577 | A | 11/1994 | Davis et al. | |
| 5,371,551 | A | 12/1994 | Logan et al. | |
| 5,392,066 | A | 2/1995 | Fisher et al. | |
| 5,412,416 | A | 5/1995 | Nemirofsky | |
| D361,550 | S | 8/1995 | Mundt et al. | |
| 5,508,713 | A | 4/1996 | Okouchi | |
| 5,510,602 | A | 4/1996 | Evans et al. | |
| 5,510,828 | A | 4/1996 | Lutterbach et al. | |
| D370,466 | S | 6/1996 | Vossoughi | |
| 5,537,126 | A | 7/1996 | Kayser et al. | |
| 5,557,721 | A | 9/1996 | Fite et al. | |
| 5,566,353 | A | 10/1996 | Cho et al. | |
| 5,572,653 | A | 11/1996 | DeTemple et al. | |
| 5,574,574 | A | 11/1996 | Kawamura | |
| 5,576,725 | A | 11/1996 | Shimada | |
| 5,584,025 | A | 12/1996 | Keithley et al. | |
| 5,604,509 | A | 2/1997 | Moore et al. | |
| 5,612,741 | A | 3/1997 | Loban et al. | |
| 5,613,051 | A | 3/1997 | Iodice et al. | |
| 5,642,484 | A | 6/1997 | Harrison, III et al. | |
| 5,742,265 | A | 4/1998 | Stoller | |
| 5,761,601 | A | 6/1998 | Nemirofsky et al. | |
| 5,838,790 | A | 11/1998 | McAuliffe et al. | |
| 5,844,181 | A | 12/1998 | Amo et al. | |
| 5,889,501 | A | 3/1999 | Sasaki et al. | |
| 5,949,411 | A | 9/1999 | Doerr et al. | |
| 5,955,710 | A | 9/1999 | DiFranza | |
| 6,038,545 | A | 3/2000 | Mandeberg et al. | |
| 6,067,011 | A | 5/2000 | Leslie | |
| 6,104,507 | A | 8/2000 | Nakanishi et al. | |
| 6,188,378 | B1 | 2/2001 | Yamamoto et al. | |
| 6,188,569 | B1 | 2/2001 | Minemoto et al. | |
| 6,199,104 | B1 | 3/2001 | Delph | |
| 6,250,428 | B1 | 6/2001 | Amo et al. | |
| 6,262,713 | B1 | 7/2001 | Brusky et al. | |
| 6,288,688 | B1 | 9/2001 | Hughes et al. | |
| 6,366,453 | B1 | 4/2002 | Wang et al. | |
| 6,504,580 | B1 | 1/2003 | Thompson et al. | |
| 6,504,713 | B1 | 1/2003 | Pandolfi et al. | |
| 6,683,584 | B2 | 1/2004 | Ronzani et al. | |
| D496,035 | S | 9/2004 | Chen et al. | |
| 6,798,655 | B2 | 9/2004 | Nagashima | |
| 6,973,669 | B2 | 12/2005 | Daniels | |
| 7,038,637 | B1 | 5/2006 | Eller et al. | |
| 7,061,754 | B2 | 6/2006 | Moscovitch | |
| D598,911 | S | 8/2009 | Wang et al. | |
| 2002/0165776 | A1 | 11/2002 | Hunter | |
| 2002/0186329 | A1 | 12/2002 | Tong et al. | |

FOREIGN PATENT DOCUMENTS

| | | | |
|---|---|---|---|
| DE | 19504923 | A1 | 8/1996 |
| DE | 19637854 | | 3/1997 |
| DE | 196737854 | A1 | 3/1997 |
| EP | 0759315 | A1 | 2/1997 |
| EP | 0822535 | | 2/1998 |
| EP | 0822535 | A2 | 2/1998 |
| EP | 0953955 | A1 | 11/1999 |
| EP | 1244303 | | 9/2002 |
| FR | 2535881 | | 5/1984 |
| FR | 2535881 | A1 | 5/1988 |
| JP | 5300563 | A1 | 11/1993 |
| JP | 7168544 | A1 | 7/1995 |
| JP | 836670 | A | 2/1996 |
| JP | 8194447 | A | 7/1996 |
| JP | 10042205 | | 2/1998 |
| WO | 9312496 | A1 | 6/1993 |

OTHER PUBLICATIONS

Telecommunications, Electrionic Advertising Combine in Flashy Signs (Originated from St. Petersburg Times, FL Jun. 4, 1995.
Fujitsu General America Announces First Big Screen, Flat Panel Plasma Display to Ship in US. Feb. 18, 1997.
Compaq Presario 3060 Aug. 1, 1997.
Coming to a Video Store Near You Oct. 7, 1998.
A Brief History of Microsoft Powerpoint Oct. 29, 2008.
Scala Infochannel ic500 1994.
Blue Skys Ahead: The Large Screen Display Market.
Introduction to Flat Panel Displays.
The Interactive Future of Signs Feb. 15, 1997.

* cited by examiner

REMOTE CONTROL ELECTRONIC DISPLAY SYSTEM

RELATED APPLICATIONS

This application is a continuation of U.S. Ser. No. 10/874,102, filed Jun. 21, 2004, now U.S. Pat. No. 7,369,058, which is a continuation of U.S. Ser. No. 10/010,556, filed on Nov. 8, 2001, now abandoned, which is a continuation of application Ser. No. 09/295,894, filed on Apr. 21, 1999, now U.S. Pat. No. 6,384,736, which is a continuation-in-part of application Ser. No. 09/132,456, filed on Aug. 11, 1998, now abandoned, which claimed the benefit of Provisional Patent Application No. 60/083,597, filed on Apr. 30, 1998.

BACKGROUND OF THE INVENTION

1. Field of the Invention

This invention relates in general to certain new and useful improvements in display signs, and more particularly, to remotely controlled electronically operable display signs in which a display on a sign may be changed at will from a remote source, and methods of displaying information in such manner that the sign is used as an instrument to enhance the image of a product or service.

2. Brief Description of Related Art

Display signs are used in a wide variety of industries, frequently as promotional and advertising aids. Thus, many retail stores will employ display signs in the front of their stores or elsewhere featuring products which are being sold or otherwise offered by that establishment. Display signs are also frequently used for traffic control by various municipalities and governmental agencies.

Essentially all display signs presently available are static in that they carry a substrate with a message or design thereon and which is to be conveyed, as for example, a paper sheet having information thereon for display and which may be frequently mounted behind a transparent member such as a sheet of glass.

In many cases, the poster or other display sheet may be mounted within a frame having a light source mounted therein. In this case, the front face of the sheet may be lighted from lights located along portions of the periphery of the frame. In some cases, when using a somewhat transparent or translucent sheet, back lighting may also be employed.

The cost of preparing display signs made with paper and paper-board substrates can be quite substantial. Initially, the art work must be prepared often times by hand, although certain computer aids for purposes of preparing the drawing may be available.

Nevertheless, preparation of the drawing is labor intensive. Thereafter, multi-color printing is usually required in order to complete the preparation of the paper or paper-board sign or display. These various steps, as indicated, are labor intensive and therefore materially add to the overall costs of preparing a sign or display, particularly when made of a paper or paper-board material.

In addition to the foregoing, there are also costs involved in the shipping or transport of these signs. Generally, they cannot be folded or bent or they would otherwise be unsuitable for use. As a result, special precautions and shipping containers must be provided for transport of the paper or paper-board substrate signs or displays.

There have also been display signs which use a frame and a source of light along with a glass or Plexiglas sheet having an image or other information literally formed on the sheet, as for example, by means of glass etching, masking, or the like.

However, with this type of display, when it is necessary or desirable to change the display in the sign, it is necessary to prepare a new piece of glass or Plexiglas or otherwise a masking on a rear surface thereof having other information presented thereon.

Here again, the cost of preparing an etched glass sheet can be quite substantial. The same also holds true of the outer transparent sheets with masks on the rear surface thereof to create a design or display with that sheet. Again, because of the frailty of these sheets, substantial precautions must be taken for the transport or shipment of these sheets.

There is presently no display sign capable of having information changed thereon as quickly as information can be changed on the screen of a computer monitor. Moreover, and independently thereof, there is presently no effective display sign which can be changed from a remote location.

OBJECTS OF THE INVENTION

It is, therefore, one of the primary objects of the present invention to provide an electronic display sign which uses a flat panel display image and which can readily be changed in accordance with electronic signals applied thereto.

It is another object of the present invention to provide an electronic display sign of the type stated which can be altered rapidly through the use of a computer or otherwise through an image scanner.

It is a further object of the present invention to provide an electronic display sign of the type stated which can be controlled from a remote source and the display on the sign can be changed at will from that remote source.

It is an additional object of the present invention to provide a display sign of the type stated which completely eliminates the need for interchangeable substrates bearing the information to be displayed.

It is also an object of the present invention to provide an electronic display sign and a method of altering a display on a sign electronically and without using interchangeable substrates bearing information to be displayed.

It is another salient object of the present invention to provide a method of displaying information by generating that information from a remote source and transmitting that information to a display sign.

It is still another object of the present invention to provide a unique circuit enabling operation of a display sign from a remote source.

It is still a further object of the present invention to provide a method of displaying information on the screen of the display sign, potentially along with other external action, such as the addition of sound or the like, to enhance a product or a service on the display sign.

It is yet another object of the present of the invention to provide a display sign of the type stated which can be used to provide value plus advertising and which also enables the use of animation with respect to any message displayed thereon.

With the above and other objects in view, my invention resides in the novel features of form, construction, arrangement and combination of parts presently described and pointed out in the claims.

BRIEF SUMMARY OF THE INVENTION

The present invention relates in general terms to a display system including a display sign which is electronically accessible from a remote source and which enables the almost automatic change of a display pursuant to control of an operator at the remote source. In a broad sense, the display system of the present invention comprises a display sign having a display panel thereon as well as display generating means at the remote source for generating a display to be displayed on that display panel. The display is actually generated in the form of an electrical signal and the system comprises a transmitting means for transmitting the electrical signal representing the display to the display panel of that display sign.

The present invention also provides a method of generating a display on a display sign from a remote source. The method involves the steps of generating the display and then transmitting that display to the display sign in the form of electrical signals representing the display. The display sign is provided with electronics using the received electrical signal to recreate the generated display and present same on the display panel.

In one embodiment of the invention, the means for transmitting the display is an electrical conductor connected between the display sign and the display generating means at the remote source. In another embodiment of the invention, the means for transmitting the display is a wireless transmission means, such as by means of radio frequency transmission, satellite transmission, or the like.

In a more preferred embodiment of the invention, the means for generating the display comprises an image generating means which enables the generation of initial image forming part of the display and a temporary storage for temporarily storing that image. Editing means are also provided for adding material to or otherwise modifying the image. Thereafter, a permanent storage is provided to enable storage of the generated display in electrical format, at least until such time as transmission thereof to the display sign.

In still a more preferred embodiment, the apparatus comprises a scanning means for scanning a particular image and converting the image into electrical signals representative thereof. The image is then stored in the temporary storage. A keyboard input may be connected to that temporary storage for introducing information through a keyboard input. In addition, means is provided for adding other copy material. Thereafter, all of the material added can be edited by an operator to form a display. The display is then stored in a permanent storage.

It is also possible to generate a display, or to otherwise add information to a display, or otherwise alter a display by means of information introduced over the World Wide Web. Thus, various inputs can be made from a variety of sources and all of which can be processed and added to or otherwise used to modify a proposed image, as may be desired.

At a predetermined time, the stored display can then be transmitted to a storage in the sign. Moreover, a plurality of different displays can be stored at the remote source and these displays can be sequentially transmitted to the display sign. In this way, an operator can manually or automatically control the generation of a plurality of desired displays in a predetermined time sequence.

The present invention not only allows for the display to be generated at the sign from a remote source, but it also allows for a plurality of displays to be presented in a desired format and in a desired predetermined time arrangement, as aforesaid. As a result, there is no need to use hard copy displays, such as pre-printed paper displays. Furthermore, minor changes can be electronically made in a display as, for example, minor price changes can be made without the necessity of re-printing.

The display sign is also of a unique construction in that it comprises means for controlling certain atmospheric conditions and, particularly, temperature in the display sign. Furthermore, an interference filter is formed on the surface of the display panel to preclude excess heat generation within the display sign. The display panel is preferably a plasma display, as hereinafter described in more detail.

The display sign preferably includes an outer housing which may be provided with a removable front face or so-called "cover." The front face is provided with an enlarged opening in order to enable a display panel to appear through that opening. A transparent protective sheet may be disposed over the display panel.

The housing is in the form of a rectangularly shaped box, although it may adopt other shapes. The major components which enable the display including the display panel are preferably mounted on a separate chassis to enable easy and convenient assembly of the display sign. The separate chassis is secured through the display box to a mounting station, such as a display stand. In this way, only one having authorized access to the interior of the display housing can disconnect the chassis and the mounting station.

The chassis in the preferred embodiment includes a power supply for operating the plasma display panel. In addition, the chassis may also comprise a second power supply for operation of a processor or computer within the housing. The computer is designed for connection to the temporary storage at the remote source and will receive generated displays in electrical signal format. The computer is programmed to recreate those displays at the sign and generate the same through the plasma display panel. For this purpose, the computer is also mounted on the chassis.

The housing is preferably provided with a plurality of openings extending primarily throughout the side wall thereof. Moreover, venting fans may also be provided for venting heated air in the housing to the exterior.

The foregoing objects and the advantages of this invention have been met and fulfilled by this system and method which has been briefly described in the general description. However, the invention will now be described in more detail in the following detailed description and in the accompanying drawings. Nevertheless, it is to be understood that these drawings and the following detailed description are only set forth for purposes of illustrating the general principles of the invention. Therefore, it should be understood that the accompanying drawings and the detailed description are not to be taken in a limiting sense.

BRIEF DESCRIPTION OF THE DRAWINGS

Figure 1:
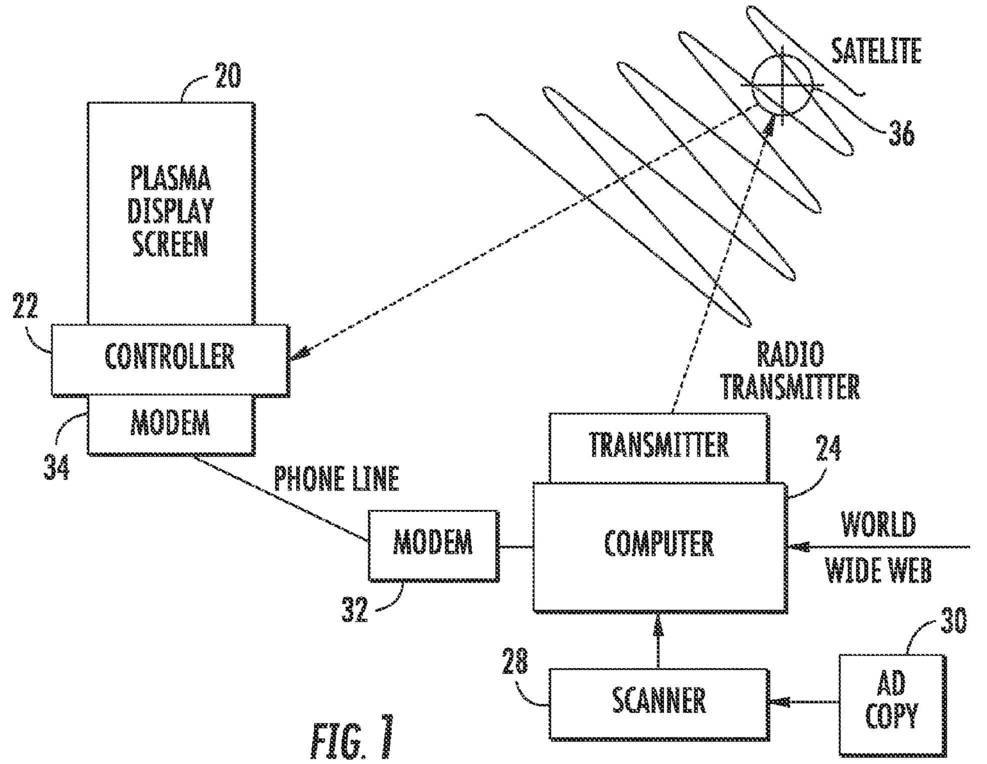
Figure 2:
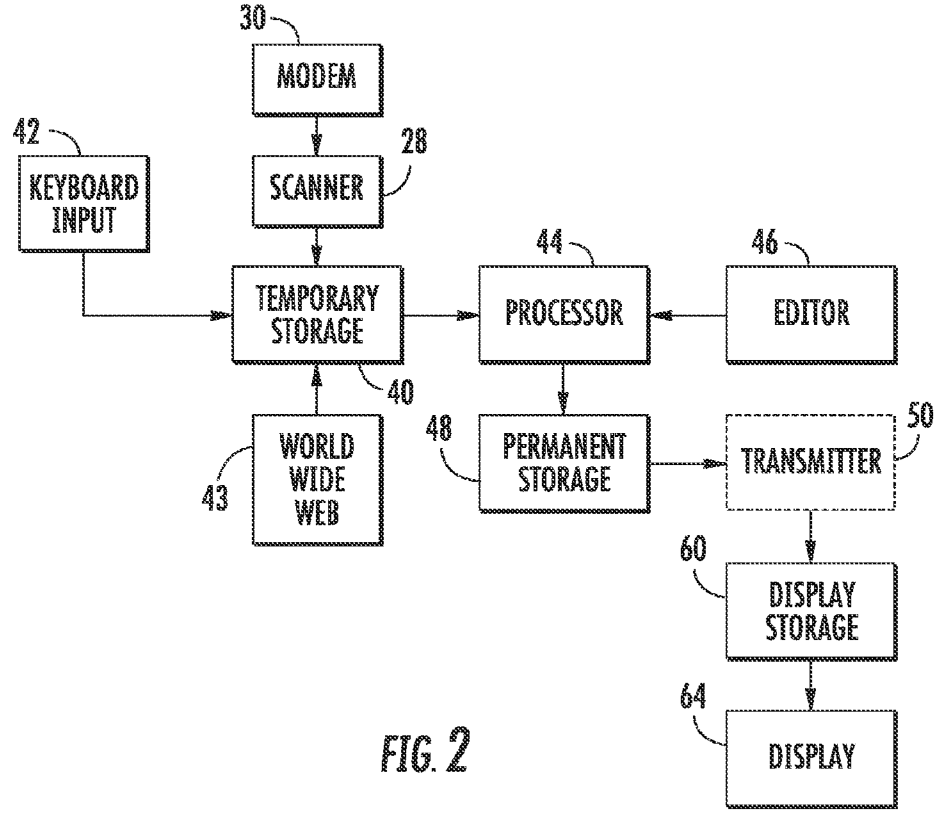
Figure 3:
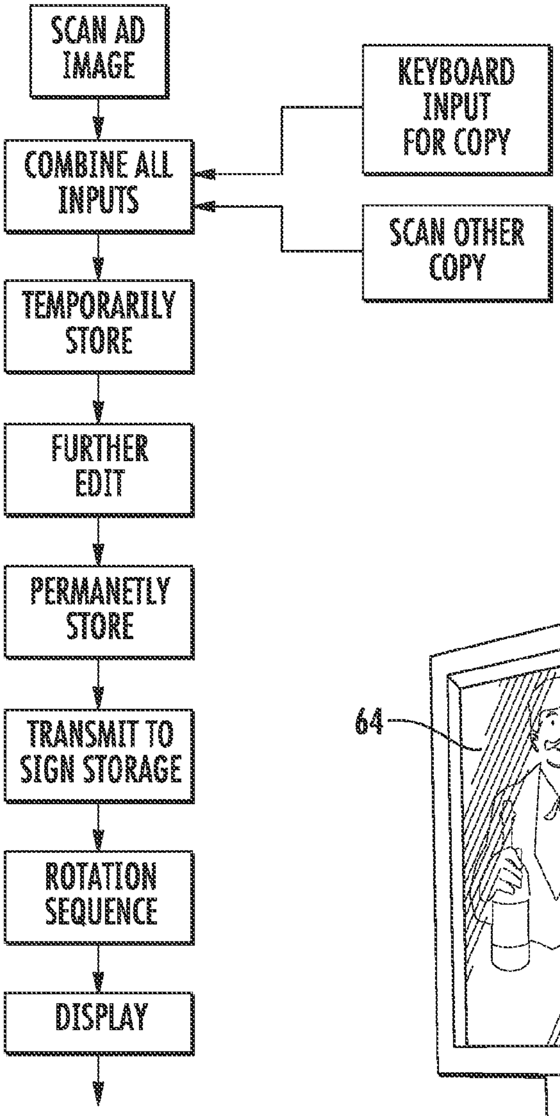
Figure 12:
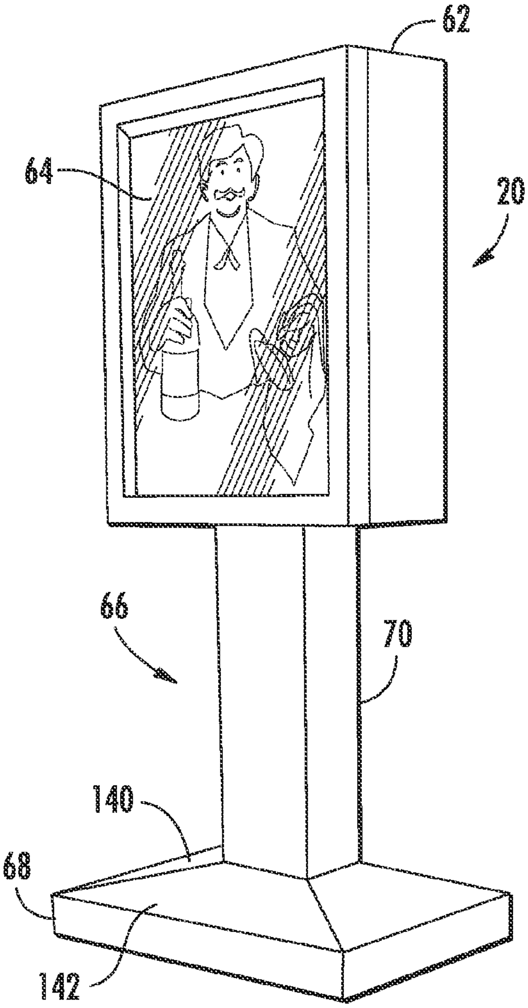
Figure 4:
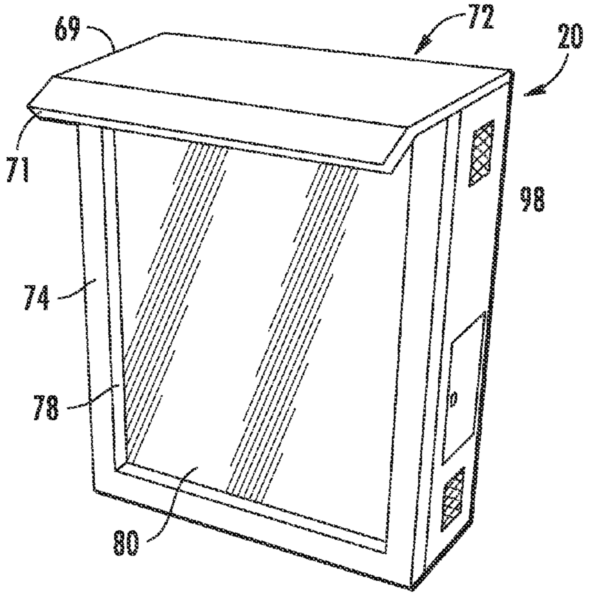
Figure 5:
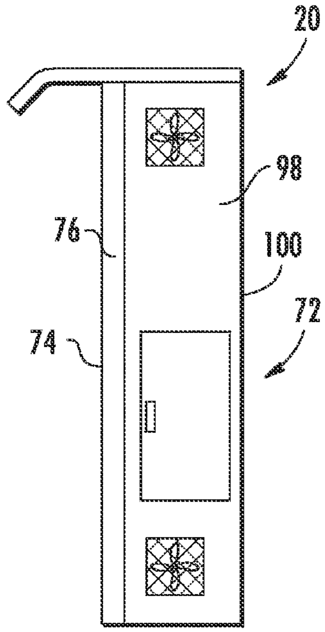
Figure 6:
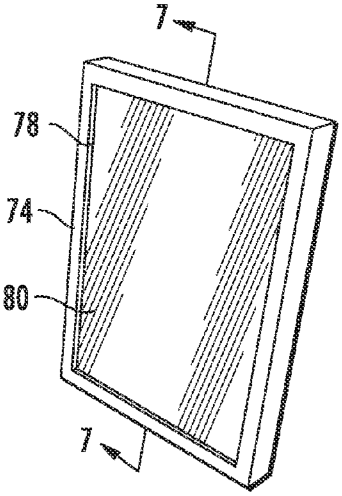
Figure 7:
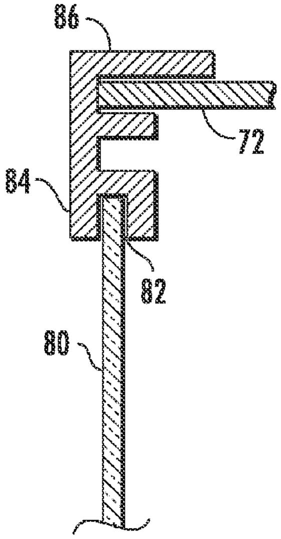
Figure 8:
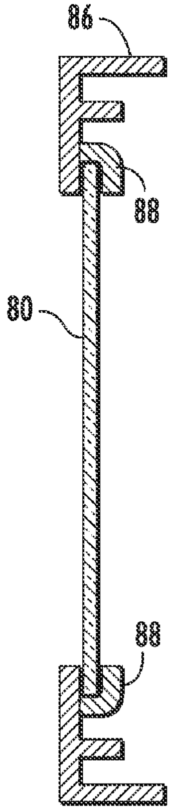
Figure 9:
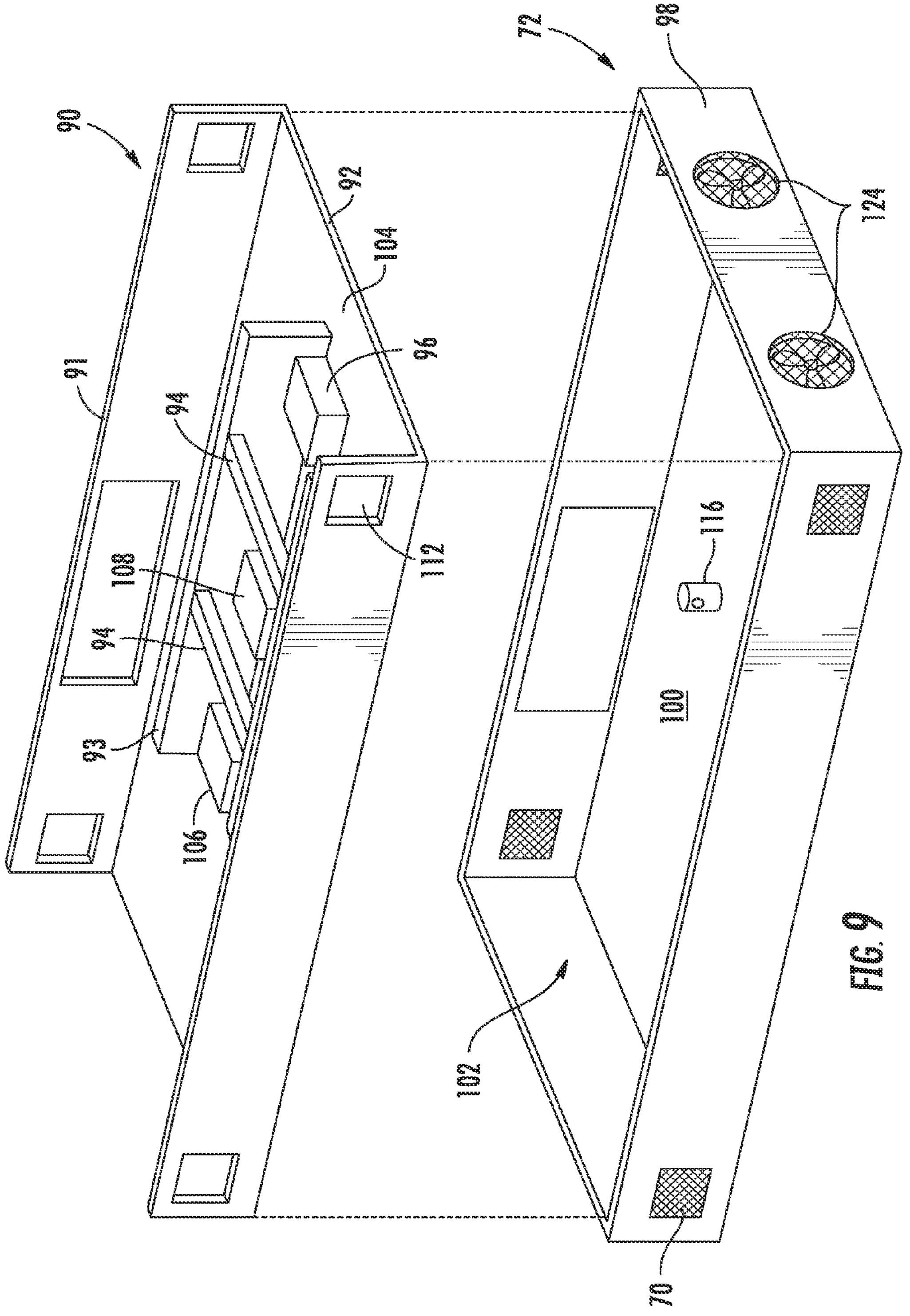
Figure 10:
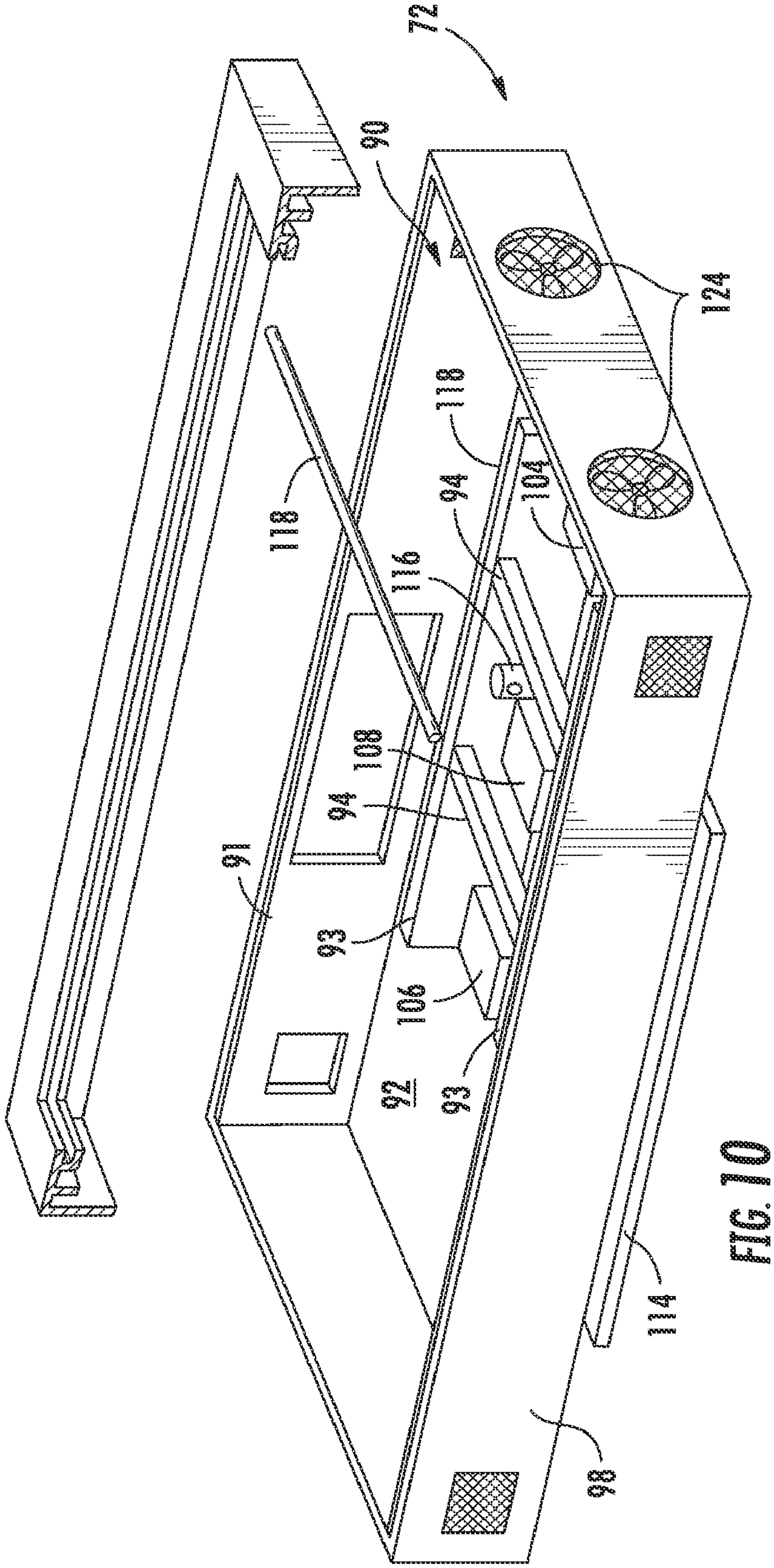
Figure 11:
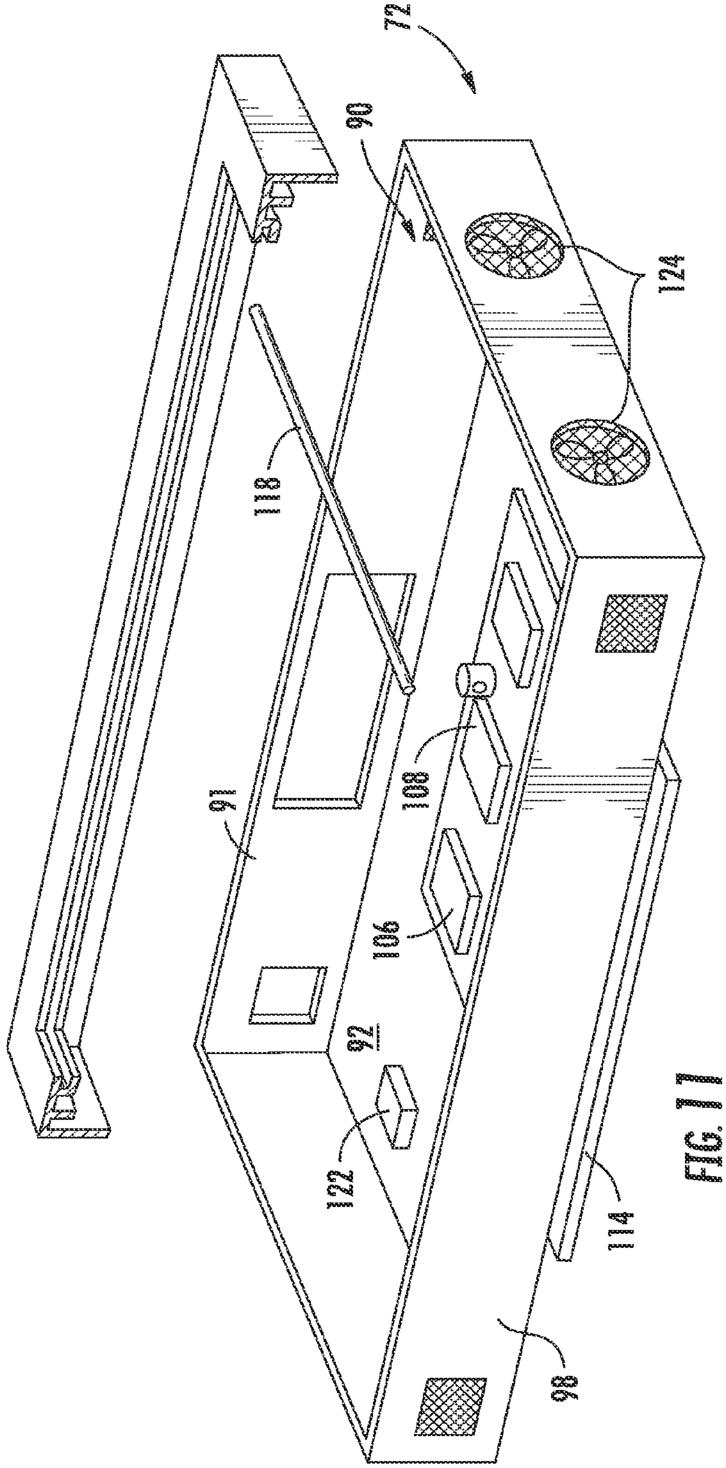
Figure 13:
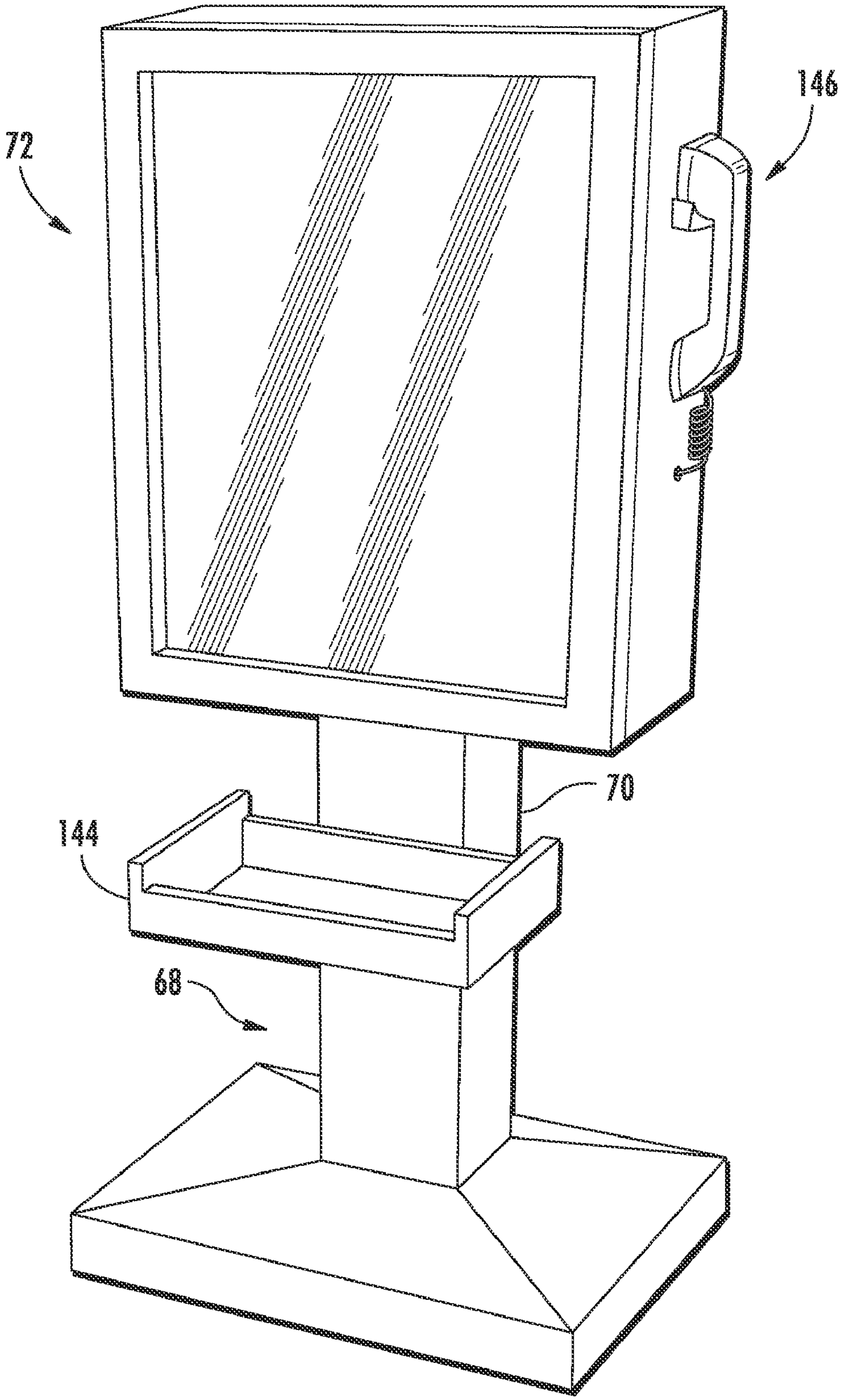

Having thus described the invention in general terms, reference will now be made to the accompanying drawings in which:

FIG. 1 is a schematic component view showing those elements necessary for generating a display either through hard wired conveyance or otherwise wireless conveyance of information;

FIG. 2 is a schematic circuit diagram showing major components necessary involved in the generation of an electronic display from a remote source;

FIG. 3 is a schematic flow diagram showing those steps involved in generating a display from a remote source;

FIG. 4 is a perspective view of one form of display sign constructed in accordance with and embodying the present invention;

FIG. 5 is a side elevational view of the display sign of FIG. 4;

FIG. 6 is a perspective view of a lid or cover which extends over the display sign;

FIG. 7 is a fragmentary vertical sectional view taken along line 7-7 of FIG. 6;

FIG. 8 is a vertical sectional view, similar to FIG. 7, and showing a slightly modified form of cover used with the display sign of the present invention;

FIG. 9 is an exploded perspective view showing some of the major components in the display sign of the present invention;

FIG. 10 is an exploded fragmentary perspective view, partially broken away, and somewhat similar to FIG. 9, and showing the various components in their assembled position;

FIG. 11 is a fragmentary sectional view showing one form of panel construction used in the present invention;

FIG. 12 is a perspective view showing one type of mounting for a display sign constructed in accordance with and embodying the present invention; and FIG. 13 is a fragmentary perspective view showing a modified form of display sign constructed in accordance with and embodying the present invention.

Figure 14:
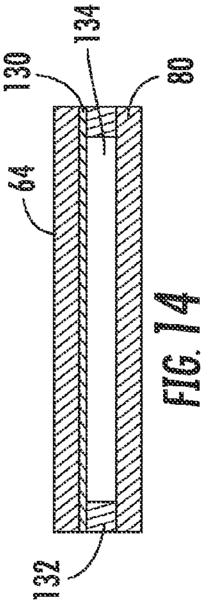

FIG. 14 is a vertical sectional view showing the relationship of the display panel and a transparent cover plate therefor used in the system of the present invention.

DETAILED DESCRIPTION OF A PREFERRED EMBODIMENT

Referring now in more detail and by reference characters to the drawings, FIG. 1 illustrates the major components forming part of a display system D in accordance with the present invention. This display system primarily shows the generation of a display from electrical signals representative of that display at a remote location and transmission to a display sign for recreation on that display sign.

In accordance with the schematic illustration of FIG. 1, the display system D comprises a display sign 20. Incorporated within the display sign 20 or otherwise being connected to the display sign is a sign controller 22. This controller may adopt the form of a microprocessor or computer in the sign and preferably includes a storage, as hereinafter described in more detail.

The display system D of the invention further comprises a display generating means 24 at a remote source and which is usually comprised of a computer 26 which may adopt the form of a processor and storage, as well as a scanner 28. In the embodiment of the invention as shown, the scanner receives ad copy 30 and generates a display in electrical format which can then be transmitted from the computer 26 to the display sign 20.

One of more inputs from the World Wide Web can also be connected to the computer 26, as shown in FIG. 1, for aiding in or otherwise being used to generate the copy which is to be displayed on the plasma display screen 20. The computer 26, in the embodiment as illustrated, may be located at a remote site with respect to the display sign 20. However, it should also be understood that the display sign 20 also includes its own internal computer so that the entire display is essentially self-contained and can be operated without communication with a remote source. However, the remote source is needed in order to change any display which may otherwise be stored in the memory of the computer at the display screen, or to otherwise modify the manner in which the display is made.

FIG. 1 also illustrates both a hard wire conductor means for transmitting the generated display, as well as a wireless means for transmitting the generated display. For the purposes of hard wire conductor transmission, the computer 26 is provided with a modem 32 and the controller 22, and the display sign 20 is similarly provided with a corresponding modem 34. As indicated previously, wireless transmission is also available and could adopt the form of microwave signal transmission, radio frequency transmission, including satellite transmission, or the like. In this respect, the signal which is generated is still an electrical signal in either radio frequency format or other wireless transmission format for wireless transmission. For purposes of wireless transmission, a satellite 36, as shown, may be employed, such that the wireless transmission will follow the path 38 shown in the dotted lines of FIG. 1.

FIG. 2 illustrates those major components forming part of the display system of the present invention. In this case, the display system comprises the scanner 28 which is usually employed for purposes of generating the initial image. Typically, a pre-prepared image of the element to be displayed is used and scanned from the scanner 28 into a temporary storage 40. The image to be scanned by the scanner 28 may be a pre-drawn image or otherwise, it can be an image adopted from an existing source. The scanner 28 will effectively digitize the image and thereby store that digitized image into the temporary storage 40.

A keyboard input 42 is also connected to the temporary storage 40 for introducing information, such as typewritten information, into that storage. The temporary storage 40 also receives an input from a World Wide Web 43 and which is schematically illustrated in FIG. 2. In effect, the World Wide Web would actually constitute one or more inputs from computer transmission lines.

The temporary storage 40 operates in conjunction with a processor 44 and a manually operable editor 46. The editor 46 is primarily designed to manipulate the images introduced into the processor 44 and the information from the keyboard input 42 into a desired format. Thus, a user of the system can manually superpose one image over another or otherwise modify two images by blending them together, etc. The editor 46 merely contains controls to enable the processor 44 to perform those functions. In this sense, the editor could also be another keyboard input much in the same manner as a computer keyboard input.

The information from the temporary storage 40 is then introduced into a permanent storage 48 where it can be retained, either indefinitely, or at least until such time as it is transmitted to a display sign, as hereinafter described in more detail.

The display system of the invention may also comprise a transmitting means 50 in the form of a transmitter, which is schematically illustrated in FIG. 2. The transmitter means 50 may adopt any conventional form of a transmission means as, for example, the modems 32 and 34, or otherwise for wireless transmission, a radio frequency transmitter, etc.

The aforesaid components constitute those major components which will form part of the display system and the remote site. Thereafter, the images which form the displays along with the other incorporated information therein can be transmitted to a display storage 60 located at and forming part of a display sign 20. The display sign 20, through its own processor, as hereinafter described, enables the generation of a display on a display panel 64 forming part of the display sign 20. The display panel 64 is also hereinafter described in more detail.

The display sign 20 may form part of or otherwise may be mounted on a stand 66, as best shown in FIG. 12. The stand 66 conventionally includes a base 68 as well as an upstanding leg 70, the latter of which would engage and support the display sign 20. However, it should also be understood that the display sign 20 could be provided with a mounting means, as hereinafter described, for mounting to a wall or like structure.

FIG. 3 illustrates some of the major steps associated with the method for generating a display from a remote source. In this case, it can be seen that an image, such as an advertising image, is scanned and digitized for introduction into a temporary storage, such as the temporary storage 40. Again, keyboard input information is also provided, as well as other copy information, as shown in FIG. 3. This other copy information is typically introduced through the scanner 28.

After the display has been formed, it is stored in the permanent storage 48 and then introduced into the display storage 60. FIG. 3 also illustrates a rotational sequence program which can be used at the remote site or at the display sign. Thus, various displays can be generated in sequence at the display sign and at pre-determined time intervals.

The display sign 20 is more fully illustrated in FIGS. 5-11 of the drawings. The display sign 20 generally comprises an outer housing 72, such as a rectangularly shaped housing. The housing is preferably formed of a metal and even more preferably a light weight metal, such as aluminum, although it could be formed of steel or other structural materials. In this respect, the housing could also be formed of plastics and even reinforced composite plastics.

The housing 72 is provided with a removable lid or cover plate 74 having a depending rim 76 which fits around a portion of the side wall of the housing 72. In addition, the lid or cover plate 74 is provided with an enlarged central opening 78 in order to enable the display panel 64 to appear therethrough. A transparent cover plate 80, in the nature of a protective sheet, could also be included in this opening 78 if desired. Furthermore, the removable lid or cover plate 74 is secured to the housing 72 in some manner as to preclude unauthorized opening as, for example, tamper-proof fasteners.

In order to preclude glare on the display panel 64, a top plate 69 is mounted on the upper end of the housing and carries at its outer end an angularly located somewhat downwardly struck visor 71. This construction is effective in reducing glare on the display screen 64, particularly from overhead light sources. The top plate 69, which also functions as a visor, is optional in construction and can be eliminated in those environments where not required. It is also possible to provide a non-glare coating on the transparent cover plate 80, although the coatings themselves have not necessarily been fully effective in eliminating all glare. In a preferred embodiment, the top plate 69 has an overall dimension from the rear of the housing of about 7". The lip 71 extends downwardly from the top plate 69 at a about a 45° angle. However, other sizes and angular relationships could be used, as may be required.

The transparent protective sheet 80 may be formed of a transparent plastic material, or otherwise it may be formed of glass. However, glass is not preferred due to the fact that it will crack or shatter with any rough handling. The transparent protective sheet 80 is retained in a U-shaped grove 82 formed at the edge of the opening 78. This opening is formed by an integrally created U-shaped channel 84 surrounding the edge of the opening 78, as best illustrated in FIG. 7 of the drawings. In addition, the lid or cover member 74 is also provided with a U-shaped channel 86 perpendicularly arranged to the grove 82 and which is sized to receive the forwardly presented edge of the housing 72, as also best shown in FIG. 7 of the drawings.

FIG. 8 illustrates a slightly modified embodiment of the construction shown in FIG. 7. In place of the formation of a U-shaped channel 84, a plurality of brackets or tabs 88 affixed to the inside of the cover member 74 surrounding the opening 78, are used to hold the transparent sheet 80 in a fixed position. The remaining portions of the lid are substantially identical to those shown and described in connection with FIG. 7.

The operating components forming part of the display sign 20 are actually mounted on a chassis 90 disposed within the housing 72. The chassis 90 comprises a pair of longitudinally extending side plates 91 and which are connected by a bottom plate or chassis plate 93, as best shown in FIG. 9 of the drawings. Moreover, and by reference to both FIGS. 9 and 10, it can be seen that the chassis 90 is disposed within the housing 72, as hereinafter described. Mounted on the upper surface of the chassis plate 92 are a pair of longitudinally extending frame bars 93 and which are connected by transversely extending cross-bars 94. Moreover, the longitudinally extending frame members 93 and the cross-bars 94 can be mounted on a supporting plate 96. Although the supporting plate 96 is provided in a preferred embodiment, it is not absolutely necessary and this plate could be eliminated, if desired.

The housing 72 is preferably comprised of an enclosing side wall 98 and a rear wall 100 which extends thereacross and thereby forms an interior chamber 102. The chassis 90 can be secured to this rear wall 100 by means of screws or other fasteners (not shown) which extend through the back plate. However, other forms of securement could be provided for this purpose, as hereinafter described.

The major operating components of the display sign are mounted on this chassis which is located within the housing 72, as aforesaid. These major operating components include a power supply 104 for the computer 26 and which also contain the display storage 60. A separate power supply 108 is also mounted on the chassis plate 96 and provides operating current for the other components of the display housing. The computer is effectively a microprocessor and contains the storage, as aforesaid, as well as a random access memory and a processor for controlling the display of a sign and also is operated from a control source at a remote location. Thus, and in this respect, the computer 106 is effectively a "slave" computer in that it receives instructions from the remote source and performs those instructions in the display sign by generating the proper display in accordance with the signals submitted to the computer 106.

Located on and secured to the upper surface of the chassis 90 is the display panel 64. In a preferred embodiment of the invention, the display panel is a plasma display. These display units are relatively thin and have a thickness in the order of about 35 mm. One of the preferred forms of display panel is made by Fujitsu and is identified as a "Full Color Plasma Display". These displays effectively operate as high-definition direct-view television monitors.

These displays generally contain about 640 horizontal display pixels and about 480 vertical pixels along with about 1920 horizontal display cells and 480 vertical display cells. Moreover, they operate with gradations of red, green and blue and present a viewing angle of about 140°. Internally, the display is usually comprised of an IF controller, a data controller, a random access memory, and a driver controller. Nevertheless, since the plasma display is available in the art, it is therefore neither illustrated nor described in any further detail herein.

It is important to recognize that the display sign itself is generally fully self-contained and can literally be moved and operated at different locations. This is unlike the larger versions of display signs in which separate computer operated systems are required in order to operate the display panel itself. These display signs are effectively made with high definition and high resolution display panels. The panels are flat, as aforesaid, and can be operated at standard line current, such as 120 volt AC current. As indicated previously, all of these plasma operated display panels are computer operated.

In accordance with the present invention, the entire display panel, whether or not a plasma panel, is computer operated from a computer source located within the display sign housing. In this sense, a remote source is used to generate the display which is to be shown on the display panel. However, a plurality of displays can be pre-prepared and stored in the memory of the computer contained in the display panel housing. Nevertheless, the remote source would be used to revise or alter those displays, as may be required.

Based on the foregoing, the display panel of the invention can be described as a self-contained computer controlled flat panel display screen providing high resolution and definition. Although it is preferable to use the plasma operated display panel, it is possible to use those relatively flat computer controlled display panels which are not plasma operated but nevertheless still provide high resolution and definition and which are still nevertheless portable. Therefore, the display panel which is referred to as a computer controlled display panel is preferably one which is self-contained and includes a computer controlling a flat panel display screen of the type which provides both high resolution and definition and which is also relatively portable without the need for heavy transport equipment. This computer controlled display panel, when used in a display sign, also has a computer operating the display panel located in the display sign housing.

The aforesaid plasma display screens are relatively thin in their overall construction, having a thickness within the range of about 35 mm, as aforesaid. Nevertheless, the flat panel display panel of the present invention is one which is deemed to have a thickness which does not exceed about six inches. Moreover, the entire display sign preferably does not have a thickness exceeding about twelve inches. Although it is possible to use a computer for controlling the display panel outside of the sign housing, it is preferable to incorporate the computer in the sign housing.

The display panel used in the display system of the present invention differs substantially from that of a standard television type display. In a television display, the image will change at the display rate as, for example, fifty frames per second. Even though the image may not change such that the viewer perceives of a same display, the master pattern is such that the image on that screen nevertheless changes at the display rate. In the case of the present invention, the display on the screen may remain for essentially any period of time, including several seconds or several minutes, and there is no composite of frames to generate an image.

As indicated previously, the display system of the invention is portable. In other words, the entire display housing and stand can be moved from one location to another without heavy lifting and transporting equipment. The entire display panel and housing, along with the stand, could weigh as much as one hundred seventy pounds, but it is nevertheless liftable and movable by two or three persons. In contrast, with some of the large display signs which are presently used as, for example, a marquees over large hotels and the like, those displays may weigh several thousand pounds and require a hoist and like equipment to move same. Nevertheless, since the entire display housing can be transported from one location to another and, indeed, the display panel can be easily transported from one location to another without the need for heavy cranes and the like, these display panels and, for that matter, the entire display sign is deemed to be portable.

The location of each of the aforesaid operating components within the housing does generate heat within the housing. For this purpose, the housing 72 is provided with a plurality of apertures 110 on the side walls thereof, as shown in FIG. 9. In like manner, the chassis is provided with aligned apertures 112, as also shown in FIG. 9. In this way, air-flow ventilation is allowed. Moreover, and if desired, either exhaust fans or air in-take fans could be provided in adjacent relationship to the openings 110 and 112. Other types of ventilation means could also be provided, if desired.

It has been found in connection with the present invention that optimum flow and ventilation is achieved when a pair of oppositely disposed air intakes and a pair of oppositely disposed air outlets are provided. In addition, two fans are preferably used for air circulation throughout the housing. Thus, in the embodiment as shown in FIG. 9, for example, there are a pair of air inlets 110 and a pair of air outlets 112. Mounted on the bottom wall of the housing, as hereinafter described, are a pair of fans 124. This type of arrangement is highly effective in precluding condensation formation in the space between the actual display panel 64 and the transparent cover plate 80.

The entire housing 72 is mounted on a mounting plate or support plate 114, as best shown in FIG. 10 of the drawings. In this case, the support plate 114 is, in turn, secured to a wall or other support structure as, for example, the stand 66, as shown in FIG. 12. The mounting plate 114 is a provided with an upstanding protrusion 116 which extends through an opening (not shown) in the rear wall 100 of the housing. Thereafter, a locking pin 118 is provided for extension through the side walls of the housing and the opening in the protrusion 116. In this way, it is virtually impossible to remove the display sign from the mounting plate 114, unless one has authorized access to the interior of the housing 72. However, it should be understood that other means for mounting the housing 72 to the mounting plate 114 could be provided for this purpose.

The display panel 64 may be disposed on the upper surface of the chassis, as aforesaid, or otherwise located within the housing. In addition, it may be connected to the electronics and located within the cover plate 74 in adjacent relationship to the transparent cover plate 80. However, the display panel is preferably provided with an interference film or layer 130 which reduces heat introduction into the housing and operates as a type of interference film. Nevertheless, the interference film 130 could be located on the transparent cover plate 80 for this particular purpose. FIG. 14 shows a stacked arrangement in which the display panel 64 is provided with the interference film 130 and the outer transparent cover plate 80. If desired, these components could be laminated together.

It is also possible to provide a spacer frame 132 between the transparent cover plate 80 and the display panel 64, thereby providing an intermediate isolated space 134, all as best shown in FIG. 14. If the space 134 is properly insulated, then there is little or no possibility of condensation forming in the interior thereof. Moreover, the space 134 could be evacuated during the construction of the assembly.

It has also been found that the plasma operated screens will generate radio frequency interference. Moreover, it has been found that the interference film which is employed can be placed directly on the plasma operated display panel in order to preclude this interference. For this purpose, the interference layer is approximately 1.5 mil thick. It has been found that a plastic cover cannot be used for this purpose because of potential out gassing.

The display system of the present invention provides a unique advantage which has not been heretofore available. The display can be generated in this case as an analog display. Prior art systems, on a limited basis, have used computers to generate a display on a sign. However, that display is necessarily generated in a digital format and, thus, has significant limitations on the quality and the ability of a particular display to be generated. Contrariwise, in the present invention, a display, which may be generated from a photographic image, can be essentially recreated on a display sign from a remote source.

The display system of the present invention not only operates as a true display sign per se, but it is also effective in operating as a type of product or service promotion enhancing medium. Thus, not only does the display sign present a display as such, but the manner in which the display system is operated literally has been found to provide a type of advertising or promotional medium. For this purpose, the display stand itself may be provided with an arrangement for displaying products. Referring again to FIG. 12, it can be seen that a plurality of upstanding dividers 140 (four as shown) divide the upper surface of the base 68 into individual compartments 142. Various products can be displayed directly in these individual compartments. As a simple example, if the display stand were used in a supermarket, cans of a specified vegetable may be literally stacked in one of the compartments 142, packaged meat products could literally be displayed in another one of the compartments, etc. For this purpose, the construction of the base can vary and, for that matter, additional shelves can be mounted on the legs 70 in order to increase the display space.

In another embodiment of the invention, the display sign can be used as a type of point of sale promotion enhancer. Referring to FIG. 13, for example, it can be observed that there is a display sign 20 also mounted on a stand 68 having an upstanding leg 70. For purposes of providing information, such as coupons which could be used, e.g. in a drugstore, a rack 144 is mounted on the leg 70, as shown in FIG. 13. This rack can be sub-divided into individual compartments for holding various types of informational sheets which may be picked up by a user. In addition, and for purposes of making reservations when a display advertises a particular feature or event, or when the display advertises a hotel, for example, a telephone 146 can also be connected to the outer housing 72. This telephone 146 could either be a dialing telephone or one which is connected directly to a source capable of taking a reservation or otherwise booking an arrangement for the caller. Thus, as a simple example, the display sign could be generating displays featuring a particular hotel and if the observer is pleased with the displays generated, he or she can merely pick up the telephone handset, as shown in FIG. 13, and immediately access an operator or other agent capable of making the reservation or booking the particular event or hotel room for the caller.

These few features alone illustrate the wide versatility capable of being achieved with the display system of the present invention. In this respect, the display system can generate a type of "streaming media", that is, it possesses the capability of presenting continuously groups of advertisements which may be run together end on end and, for that matter, can even blend advertisements. This may be particularly advantageous when a product display is also set up on the base, as previously described. In addition, the display can actually be animated with a type of 3-D presentation. Various graphic aids can also be used. As a simple example, the display can be generated initially from top to bottom or from bottom to top. FIG. 12 shows, for example, a display which is coming from the lower right hand corner of the display screen and which is being increased in size over time. Thereafter, the next display could come from a different corner or from a side, top or bottom of the screen. This type of presentation has been found to generate a great deal of attention.

In addition to the foregoing, the product or service which is being generated can also be animated in order to obtain attention of individuals. Furthermore, sound can be generated. Thus, as a simple example, on each occasion when a new product or service is offered or, for that matter, when images of a particular product or service being offered changes, a bell can ring or other noise can be generated in order to catch the viewer's attention. As indicated previously, the basket or rack enables hand-outs to the viewer and, thus, represents a type of "uplift" advertising, that is, it causes people to purchase more of a particular product or service than they would otherwise purchase.

The display system of the invention also has the capability, particularly when operated from a remote source, of causing alterations of the display at any point in time. Thus, for example, if an eight ounce box of a particular product is being displayed, it is possible to immediately cause a four ounce box of that same product or, for that matter, another product to be presented over the image of the eight ounce box of product. Moreover, with the animation and the fact that the display can be generated in essentially any fashion, it is possible to place a product or service in a most favorable light.

It is also possible to operate a plurality of these display signs at a single location or at different locations from one remote source. Moreover, all of the display signs could be operated simultaneously or individually. In addition, all of the display signs could be connected together through a single telephone circuit enabling the access of all of the individual display panels. In other words, one computer can operate a plurality of display signs or other display generating panels through telephone circuitry or by other means.

One of the features of the display stand of the invention is the fact that it actually attracts the viewer, that is, viewers will literally stand in front of the display in order to view same. This has been found to be important in that it actually increases the purchase or other acquisition of the service or product. Thus, the display stand not only functions to merely advise of the availability of a product or service, but it provides information about that product or service and, in addition, promotes and enhances the product and service so that the interest of the viewer is increased in that product and service by viewing the display. In this way, the display device not only functions to present displays, but it actually functions to enhance and increase the advertising appeal of a particular product or service.

Thus, there has been illustrated and described a unique and novel display system which enables a display sign to be operated from a remote source and where a display can be generated at the sign based on signals from the remote source and which are transmitted to the display sign for generation of an analog display thereon. The display system and the display sign forming a part thereof thereby fulfill and meet all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described out invention, what I desire to claim and secure by Letters Patent is:

1. A display system for generating one or more images of a product or service on a display panel and enhancing the image of the product or service displayed thereon, sad display system comprising:

i) at least one display sign comprising:

a) an outer housing and b) a display panel on said housing and being observable to a viewer; and ii) a computer means in proximity to said housing and dedicated to the operation of the at least one display sign, said computer means operating on the basis of a series of sequential programmed instructions at a predetermined time or on a real time basis, sad computer means A) controlling the image presented on said display panel, B) being capable of altering the direction and manner in which the image is generated on the display panel, D) being capable of providing enhancement of any computer generated effects to an image on the display panel to thereby enhance or modify the image displayed on said display panel, and E) being capable of providing animation to the image of a displayed product or service to increase consumer appeal to the displayed product or service.

2. The display system of claim 1 further characterized in that computer means is a dedicated computer means dedicated to the operation of the display system and for operation as a stand alone computer means.

3. The display system of claim 1 further characterized in that said computer means is a dedicated computer means.

4. The display system claim 1 further characterized in that each display sign is located in a position so as to orient the display panel to be observed by a plurality of observers.

5. The display system of claim 1 further characterized in that certain of said housings are mounted on stands which have shelf space for holding a product of the type being displayed on said display panel or printed information on a product or service of the type being displayed on the display panel.

6. The display system of claim 1 comprising a self-contained computer operated processing means associated with said display sign for generating a plurality of displays from electronic signals containing information relating to the displays and memory means associated with said processing means and storing information delivered in digital signal format as digital signals and allowing the digital signals to be reconverted to visible images which are displayed at one or more selected ones of said display panels, and where a large number of different displays are storable in said memory means and displayed at time selected periods independently of external electronic signals from a remote source.

7. The display system of claim 6 further characterized in that said computer operated processing means is capable of receiving electronic signal containing information relating to the displays from a remote source the information from the remote source and controlling the display of that information as displays on the display pane and also controlling the generation of displays on the display panel which are stored in the memory means, and said computer also being operable independently for operating as a stand alone computer and as a means for accessing the internet through the World Wide Web.

8. The display system of claim 1 further characterized in that said system further comprises: receiving means for receiving electronic signals transmitted to the display system from a remote source and which are representative of a plurality of displays to be displayed on one or more of the display panels.

9. The display apparatus of claim 1 further characterized in that said display signs are readily transportable and completely self-contained and positionable at a generally fixed location for operation at that fixed location.

10. The display system of claim 1 further characterized in that said display system comprises a plurality of display signs each of which is locatable at a substantial distance from a signal generating means at a remote source which generates signals capable of being converted to images to be displayed by the display sign, whereby each said display sign is operable as a self-contained unit independently of any networking for generation of displays.

11. The display system of claim 1 further characterized in that said display panel comprises a flat panel high resolution display screen.

12. The display system of claim 1 further characterized in that the said housing is mounted on a stand which has shelf space for holding a product of the type being displayed on said display panel or printed information on a product or service of the type being displayed thereon.

13. The display system of claim 1 wherein the images are displayed as a succession of images.

* * * * *

UNITED STATES PATENT AND TRADEMARK OFFICE

CERTIFICATE OF CORRECTION

PATENT NO. : 8,330,613 B2
APPLICATION NO. : 12/116053
DATED : December 11, 2012
INVENTOR(S) : Dave Gothard It is certified that error appears in the above-identified patent and that said Letters Patent is hereby corrected as shown below:

In the Claims:

In claim 1, column 12, line 64 and in column 13, line 7, the word "sad" should be removed and replaced with the word -- said --, in each instance.

In claim 5, column 13, line 27, the phrase "claim 1" should be removed and replaced with the phrase -- claim 4 --.

In claim 7, column 14, line 8, the word "pane" should be removed and replaced with the word -- panel --.

Signed and Sealed this
Twenty-third Day of April, 2013

Teresa Stanek Rea
*Acting Director of the United States Patent and Trademark Office*